US008249511B2

(12) United States Patent
Liu et al.

(10) Patent No.: US 8,249,511 B2
(45) Date of Patent: Aug. 21, 2012

(54) DOWNLINK WIRELESS TRANSMISSION SCHEMES WITH INTER-CELL INTERFERENCE MITIGATION

(75) Inventors: Lingjia Liu, Plano, TX (US); Jianzhong Zhang, Irving, TX (US); Donghee Kim, Seoul (KR); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 12/454,539

(22) Filed: May 19, 2009

(65) Prior Publication Data

US 2009/0325591 A1 Dec. 31, 2009

Related U.S. Application Data

(60) Provisional application No. 61/133,846, filed on Jul. 3, 2008, provisional application No. 61/133,094, filed on Jun. 25, 2008.

(51) Int. Cl.
*H04B 1/00* (2006.01)
*H04B 15/00* (2006.01)
*H04K 1/10* (2006.01)
*H04L 27/28* (2006.01)

(52) U.S. Cl. ...................................... 455/63.1; 375/260

(58) Field of Classification Search ............... 455/63.1; 375/260

See application file for complete search history.

(56) References Cited

U.S. PATENT DOCUMENTS

| 2007/0049218 | A1 | 3/2007 | Gorokhov et al. | |
|---|---|---|---|---|
| 2007/0133707 | A1* | 6/2007 | Hwang et al. | 375/267 |
| 2008/0037669 | A1 | 2/2008 | Pan et al. | |
| 2008/0080637 | A1 | 4/2008 | Khan et al. | |
| 2008/0125051 | A1 | 5/2008 | Kim et al. | |
| 2008/0247475 | A1* | 10/2008 | Kim et al. | 375/260 |
| 2010/0099362 | A1* | 4/2010 | Jongren et al. | 455/67.14 |

OTHER PUBLICATIONS

International Search Report dated Feb. 4, 2010 in connection with PCT Application No. PCT/KR2009/003397.

* cited by examiner

*Primary Examiner* — Steven Lim

(57) ABSTRACT

A system and method for inter-cell interference avoidance. A device capable of performing channel estimation is configured to divide a codebook into two sets. A first set of said two sets corresponds to codebook information that will cause an interference in a received signal to be less than a threshold. The device further is configured to send feedback information corresponding to the first or second set, or both. A base station is configured to select a preceding vector or matrix based, in part, on a portion of the feedback information.

33 Claims, 10 Drawing Sheets

DOWNLINK WIRELESS TRANSMISSION SCHEMES WITH INTER-CELL INTERFERENCE MITIGATION

CROSS-REFERENCE TO RELATED APPLICATION(S) AND CLAIM OF PRIORITY

The present application is related to U.S. Provisional Patent No. 61/133,094, filed Jun. 25, 2008, entitled "INTER-CELL INTERFERENCE AVOIDANCE FOR DOWNLINK TRANSMISSION", U.S. Provisional Patent No. 61/133,846, filed Jul. 3, 2008, entitled "INTER-CELL INTERFERENCE AVOIDANCE FOR DOWNLINK TRANSMISSION" and U.S. Non-provisional Patent application Ser. No. 12/445,531, entitled "INTERCELL INTERFERENCE AVOIDANCE FOR DOWNLINK TRANSMISSION" filed concurrently herewith. Provisional Patent Nos. 61/133,094 and 61/133,846 are assigned to the assignee of the present application and are hereby incorporated by reference into the present application as if fully set forth herein. The present application hereby claims priority under 35 U.S.C. §119(e) to U.S. Provisional Patent Nos. 61/133,094 and 61/133,846.

TECHNICAL FIELD OF THE INVENTION

The present application relates generally to wireless communication networks and, more specifically, to an interference avoidance of edge-cells in a wireless communications network.

BACKGROUND OF THE INVENTION

In a wireless communications network, multiple base stations (also referred to as "eNBs") use a standardized codebook for precoding transmission to their respective user equipments (UEs), using multiple transmit antennas. A typical problem of this procedure occurs where several base stations are serving their intended UEs while interfering with each other's signal. This scenario is called "inter-cell interference." Inter-cell interference constrains the throughput of the wireless network.

FIG. 1B illustrates an exemplary wireless network 100. In such example, base station (BS) 102 is the serving base station for subscriber station (SS) 116, e.g., communications to and from SS 116 are conducted through BS 102. BS 103 is the serving base station for SS 115, e.g., communications to and from SS 115 are conducted through BS 103. SS 116 is located in proximity to SS 115. Further, BS 102 is communicating with SS 116 using the same frequency band that BS 103 is using to communicate with SS 115. Therefore, SS 116 receives communications 140 from BS 102. However, SS 116 also receives communications 145 (e.g., interfering communications) from BS 103. Further, SS 115 receives communications 150 from BS 103. Additionally, SS 115 also receives communications 155 (e.g., interfering communications) from BS 102. Since SS 116 and SS 115 are in close proximity and using the same frequency band simultaneously, the communications between the subscriber stations, SS 116 and SS 115, and their respective base stations, BS 102 and BS 103, interfere with each other.

SUMMARY OF THE INVENTION

A device capable of performing channel estimation is provided. The device includes a processor; a memory; and a codebook partitioner. The codebook partitioner is configured to divide a codebook into two sets. A first set of said two sets corresponds to codebook information that will cause an interference in a received signal to be less than a threshold. Additionally, the processor is configured to send at least one of the two sets to a base station.

A wireless communications network is provided. The wireless communications network comprises a plurality of base stations, each one of the base stations is capable of selecting one of a plurality of codebooks for precoding. At least one of the base stations includes a receiver capable of receiving feedback information from at least one subscriber station. The feedback information includes at least one of a recommended set of codebook information and a restricted set of codebook information. The controller identifies either the recommended set of codebook information or restricted codebook information.

A method for interference avoidance is provided. The method includes estimating channel information. The method also includes identifying codebook information that will cause an interference in a received signal to be less than a threshold. Further, the method includes dividing a codebook into subsets, wherein at least one subset corresponds to the identified codebook information. Then, the method includes transmitting feedback information associated to the subset.

A method for interference avoidance is provided. The method includes receiving feedback information. The feedback information includes a set of codebook information that identifies a recommended set or a restricted set. A response to the feedback information is determined. A preceding matrix is selected based on the response.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

With regard to the following description, it is noted that the LTE term "node B" is another term for "base station" used below. Further, the term "cell" is a logic concept which can represent a "base station" or a "sector" belongs to a "base station". In this patent, "cell" and "base station" are used interchangeably to indicate the actual transmission units (may be "sector" or "base station" etc.) in the wireless system. Also, the LTE term "user equipment" or "UE" is another term for "subscriber station" used below.

Figure 1A:
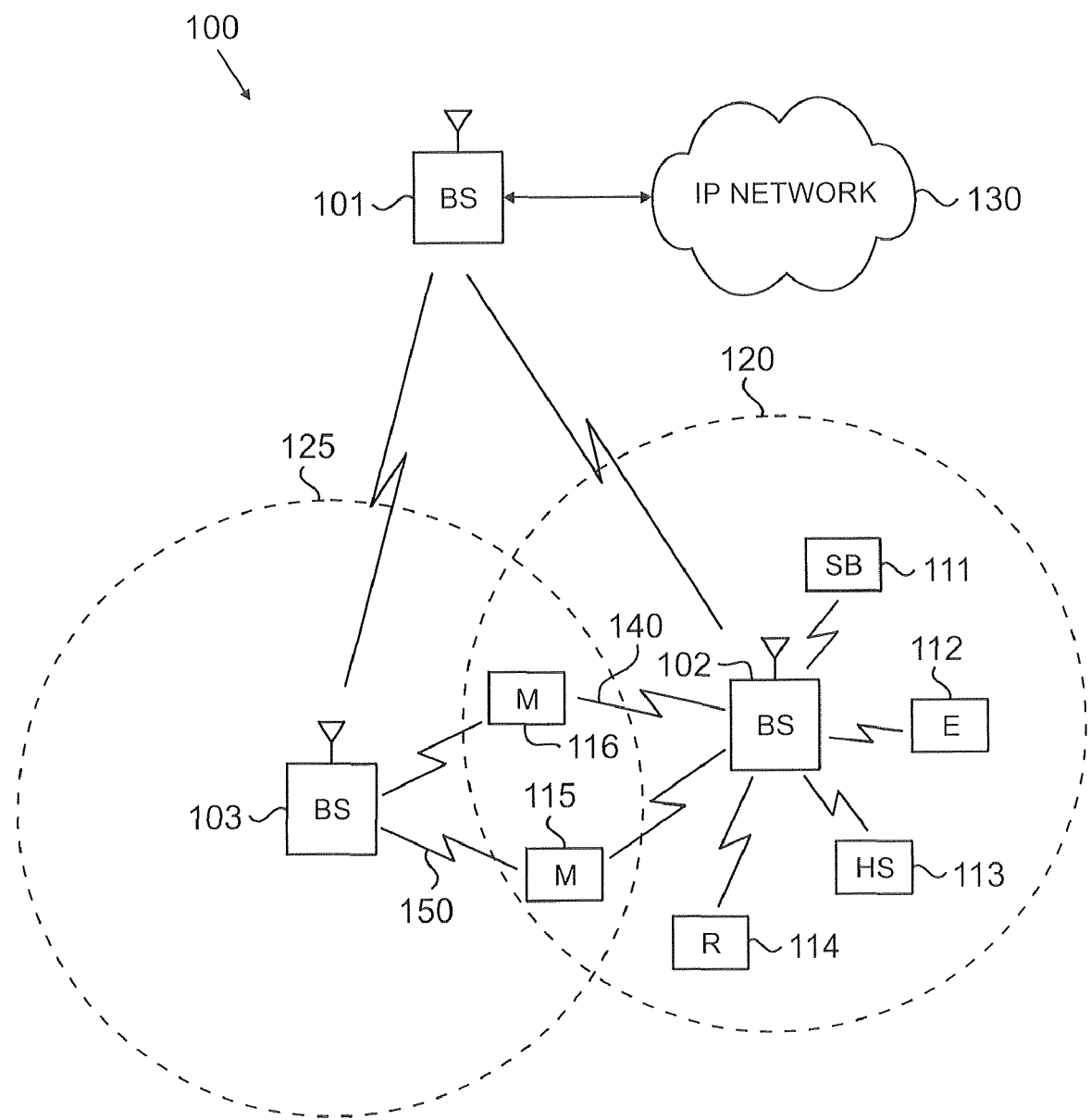
FIG. 1A illustrates exemplary wireless network 100 that is capable of decoding data streams according to an exemplary embodiment of the disclosure.

FIG. 1A illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1A, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1A. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
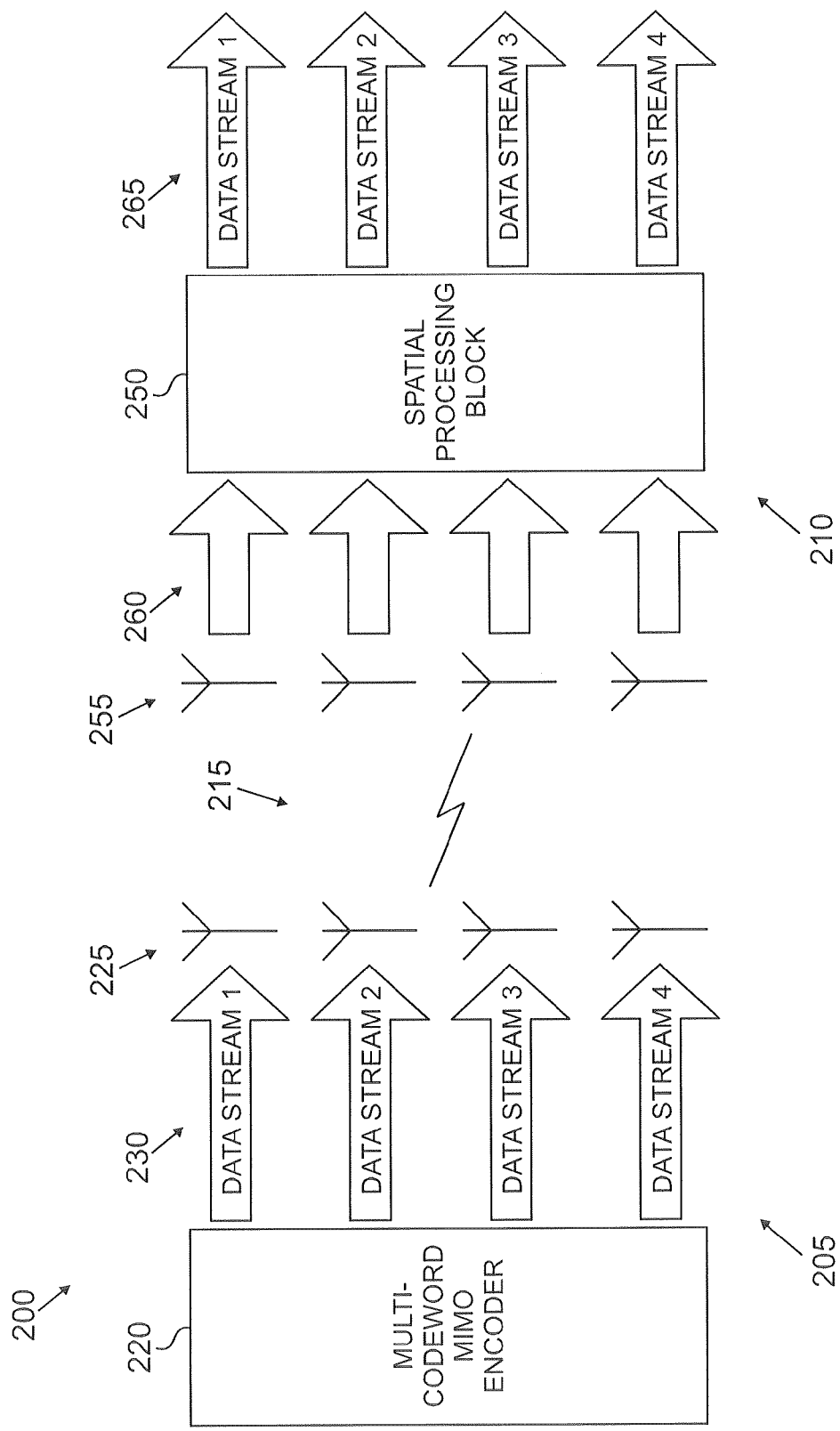
FIG. 2 illustrates a MIMO system 200 that is capable of decoding data streams according to an embodiment of the present disclosure.

FIG. 2 illustrates a MIMO system 200 that is capable of decoding data streams according to an embodiment of the present disclosure. MIMO system 200 comprises a transmitter 205 and a receiver 210 that are operable to communicate over a wireless interface 215.

Transmitter 205 comprises a multi-codeword MIMO encoder 220 and a plurality of antennas 225, each of which is operable to transmit a different data stream 230 generated by encoder 220. Receiver 210 comprises a spatial processing block 250 and a plurality of antennas 255, each of which is operable to receive a combined data stream 260 from a plurality of sources including antennas 225 of transmitter 205. Spatial processing block 250 is operable to decode the combined data stream 260 into data streams 265, which are substantially identical to the data streams 230 transmitted by antennas 225.

Spatial processing block 250 is operable to decode data streams 265 from the combined data stream 260 using an MMSE-SIC procedure that selects an order for decoding the streams 265 based on a decoding prediction metric (DPM) for each stream 265. The DPM for each data stream 265 is based on a strength-related characteristic associated with the data stream 265. Thus, for example, the DPM may be based on a capacity of the channel associated with the data stream 265, an effective signal-to-interference and noise ratio (SINR) for the data stream 265 and/or any other suitable strength-related characteristic. Using this process for decoding, receiver 210 is able to provide better performance than a receiver that decodes streams in a random order without introducing the complexity of a receiver that searches all possible decoding orders to find an optimum decoding order.

Figure 3:
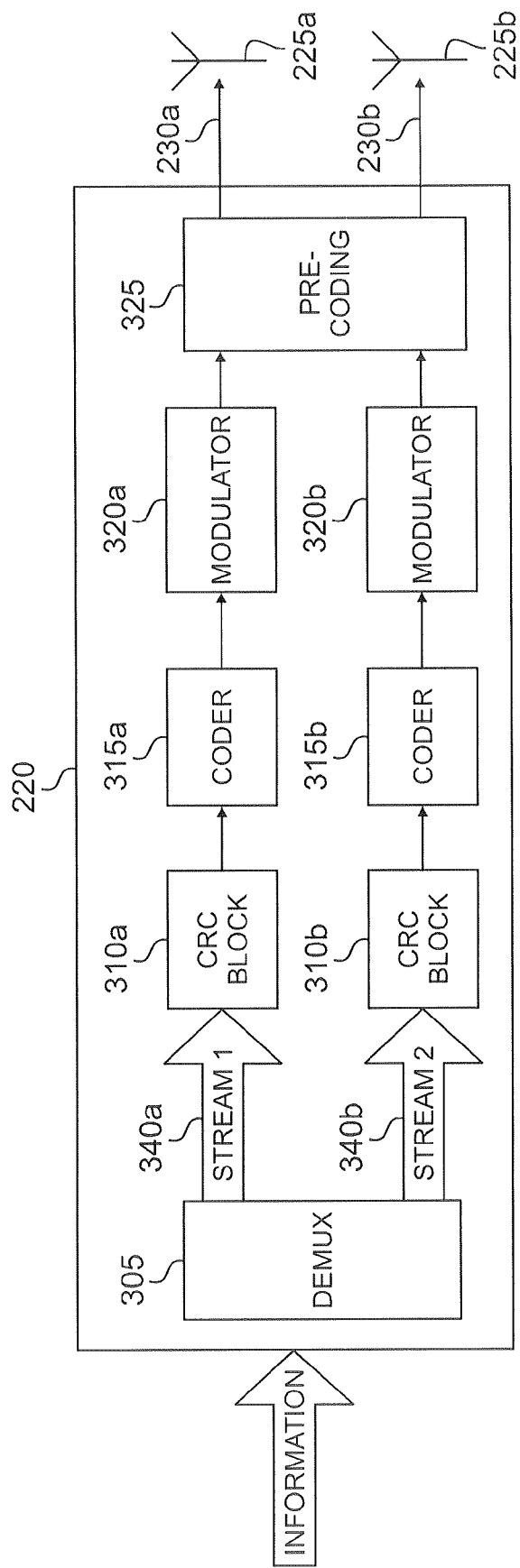
FIG. 3 illustrates details of multi-codeword MIMO encoder according to an embodiment of the present disclosure.

FIG. 3 illustrates details of multi-codeword MIMO encoder 220 according to an embodiment of the present disclosure. For this embodiment, encoder 220 comprises a demultiplexer (demux) 305, a plurality of cyclic redundancy code (CRC) blocks 310, a plurality of coders 315, a plurality of modulators 320, and a pre-coder 325. Encoder 220 is operable to receive an information block and to generate data streams 230 based on the information block for transmission over antennas 225. Although the illustrated embodiment shows two sets of components 310, 315 and 320 to generate two streams 230a-b for transmission by two antennas 225a b, it will be understood that encoder 220 may comprise any suitable number of component sets 310, 315, 320 and 325 based on any suitable number of streams 230 to be generated.

Demultiplexer 305 is operable to demultiplex the information block into a plurality of smaller information blocks, or streams 340. Each CRC block 310 is operable to add CRC data to the associated stream 340. Following the addition of CRC data, each coder 315 is operable to code the stream 340 and each modulator 320 is operable to modulate the coded stream 340. After coding and modulation, the resulting streams, which are equivalent to data streams 230, are processed through a precoding algorithm 325 and transmitted from separate antennas 225.

Because encoder 220 is a multi-codeword MIMO encoder, different modulation and coding may be used on each of the individual streams 340. Thus, for example, coder 315a may perform different coding from coder 315b and modulator 320a may perform different modulation from modulator 320b. Using multi-codeword transmission, a CRC check may optionally be performed on each of the codewords before the codeword is canceled form the overall signal at receiver 210. When this check is performed, interference propagation may be avoided in the cancellation process by ensuring that only correctly received codewords are canceled.

Precoding 325 is used for multi-layer beamforming in order to maximize the throughput performance of a multiple receive antenna system. The multiple streams of the signals are emitted from the transmit antennas with independent and appropriate weighting per each antenna such that the link through-put is maximized at the receiver output. Precoding algorithms for multi-codeword MIMO can be sub-divided into linear and nonlinear precoding types. Linear preceding approaches can achieve reasonable throughput performance with lower complexity relateved to nonlinear preceding approaches. Linear preceding includes unitary preceding and zero-forcing (hereinafter "ZF") precoding. Nonlinear preceding can achieve near optimal capacity at the expense of complexity. Nonlinear precoding is designed based on the concept of Dirty paper coding (hereinafter "DPC") which shows that any known interference at the transmitter can be subtracted without the penalty of radio resources if the optimal preceding scheme can be applied on the transmit signal.

Figure 4:
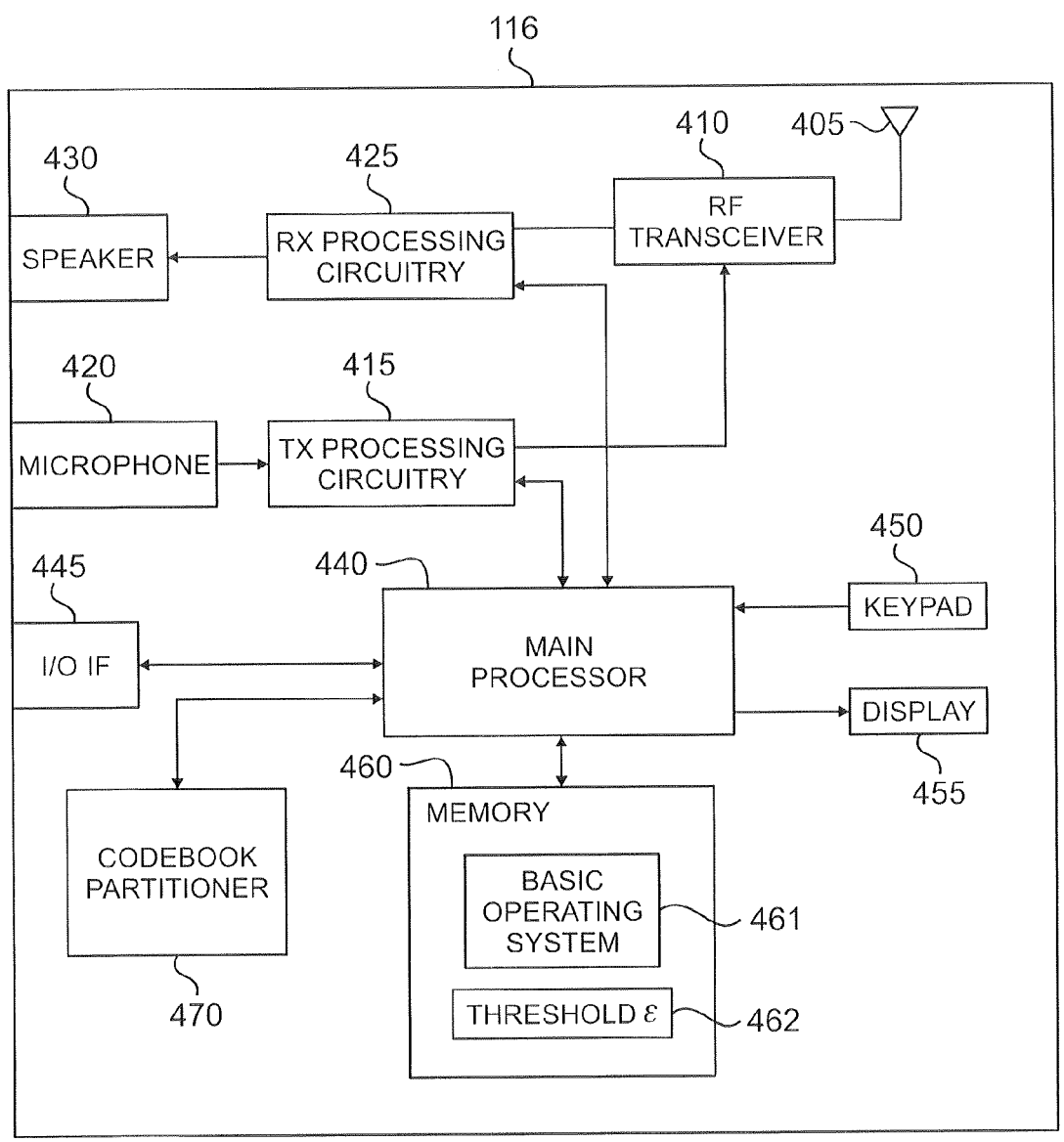
FIG. 4 illustrates wireless subscriber station according to embodiments of the present disclosure.

FIG. 4 illustrates wireless subscriber station 116 according to embodiments of the present disclosure. The embodiment of wireless subscriber station 116 illustrated in FIG. 4 is for illustration only. Other embodiments of the wireless subscriber station 116 could be used without departing from the scope of this disclosure.

Wireless subscriber station 116 comprises antenna 405, radio frequency (RF) transceiver 410, transmit (TX) processing circuitry 415, microphone 420, and receive (RX) processing circuitry 425. SS 116 also comprises speaker 430, main processor 440, input/output (I/O) interface (IF) 345, keypad 450, display 455, memory 460 and a codebook partitioner 470. Memory 460 further comprises basic operating system (OS) program 461 and threshold ϵ 462.

Radio frequency (RF) transceiver 410 receives from antenna 405 an incoming RF signal transmitted by a base station of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. Memory 460 can be any computer readable medium, for example, the memory 460 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 460 comprises a random access memory (RAM) and another part of memory 460 comprises a Flash memory, which acts as a read-only memory (ROM)

Main processor 440 executes basic operating system (OS) program 461 stored in memory 460 in order to control the overall operation of wireless subscriber station 116. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 440 can move data into or out of memory 460, as required by an executing process. Main processor 440 is also coupled to I/O interface 445. I/O interface 445 provides mobile station 116 with the ability to connect to other devices such as laptop computers and handheld computers. I/O interface 445 is the communication path between these accessories and main controller 440.

Main processor 440 is also coupled to keypad 450 and display unit 455. The operator of SS 116 uses keypad 450 to enter data into SS 116. Display 455 may be a liquid crystal display capable of rendering text and/or at least limited graphics from web sites. Alternate embodiments may use other types of displays.

Main processor 440 also is operable to estimate the channel matrix from the serving base station (e.g., BS 102). Main processor 440 further is operable to estimate channel matrices from the strong interfering base stations (e.g., BS 103) when the subscriber station (e.g., SS 116) is in an edge-cell (e.g., the edge of two or more coverage areas 120, 125).

Codebook partitioner 470 is coupled to main processor 440. Codebook partitioner 470 is configured to divide a codebook into two subsets. Based on the estimated channel matrices, the codebook partitioner 470 searches the codebook vector or matrix which maximizes the subscriber station's own receive signal power, or some other performance measures together with the codebook vectors or matrices from the interfering base stations, subject to threshold ϵ 462. The codebook partitioner 470 divides the codebook based on the channel estimations performed by the main processor 440. The codebook partitioner 470 creates a preferred set corresponding to codebook information, e.g., codebook vectors or matrices, that will cause an interference in a received signal to be less than or equal to ($\leqq$) the threshold ϵ 462. The codebook partitioner 470 also creates a restricted set. The restricted set is the complement of the preferred set. As such, the restricted set corresponds to codebook information, e.g., codebook vectors or matrices, that will cause the interference in the received signal to be greater than (>) the threshold ϵ 462.

In some embodiments, codebook partitioner 470 is a plurality of instructions contained within memory 460. In such embodiments, codebook partitioner 470 is configured to cause the main processor 440 to perform the functions described herein above with respect to the component codebook partitioner 470. For example, in such embodiments the main processor 440 divides the codebook into the preferred set and the restricted set.

The threshold ϵ 462 is a configurable parameter indicating an interference that SS 116 is able to tolerate. In some embodiments, the main processor 440 is operable to adjust threshold ϵ 462. The threshold ϵ 462 is adjusted to increase or decrease an identified number of codebook vectors or matrices that will cause an interference in a received signal to be less than or equal to ($\leqq$) the threshold ϵ 462. In some embodiments, BS 102, e.g., the serving base station, is operable to adjust threshold ϵ 462. The threshold ϵ 462 is adjusted to increase or decrease an identified number of codebook vectors or matrices that will cause an interference in a received signal to be less than or equal to ($\leqq$) the threshold ϵ 462.

Conventionally, in a so called "closed-loop MIMO system," a feedback based mechanism is used to provide information related to the channel gains from BS 102 (e.g., the serving base station) to SS 116 based on various criteria. For example, after performing the channel estimation using the training signals, SS 116 informs BS 102 which codebook vector or matrix that maximizes the signal-to-noise ratio (SNR) of the received signal based on the channel from BS 102 to SS 116. SS 116 also includes a value of the expected SNR. Then, BS 102 adapts the format of the data based on the information fed back from the SS 116. BS 102 transmits the data to SS 116. In this way, the performance (mainly the throughput) of the wireless system improves under the standardized codebook constraint.

When the two adjacent subscriber stations (SS 116 and SS 115) are scheduled to receive their data in the same frequency band, inter-cell interference can occur. The received signals for SS 116 and SS 115 are represented by Equation 1:

$$Y_1 = H_{11}X_1 + H_{21}X_2 + N_1$$

$$Y_2 = H_{12}X_1 + H_{22}X_2 + N_2, \qquad \text{[Eqn. 1]}$$

For use with Equation 1, $N_T$ is the number of transmit antennas at BS 102 and BS 103, $N_R$ is the number of receive antennas at the user equipments. In Equation 1, $H_{11}$, $H_{12}$, $H_{21}$, and $H_{22}$ are the respective channel gains; where $Y_i$ is the $N_R \times 1$ vector of received signal at subscriber station i; $X_i$ is the $N_T \times 1$ vector of transmitted signal at base station i; and $N_i$ is the $N_R \times 1$ AWGN noise vector. In Equation 1, SS 116 is denoted as "1" such that $Y_1$ is the the $N_R \times 1$ vector of received signal at SS 116. Further, SS 115 is denoted as "2" such that $Y_2$ is the the $N_R \times 1$ vector of received signal at SS 115. Additionally, BS 102 is denoted as "1" such that $X_1$ is the $N_T \times 1$ vector of transmitted signal at BS 102. Further, BS 103 is denoted as "2" such that $X_2$ is the $N_T \times 1$ vector of transmitted signal at BS 103.

Figure 1B:
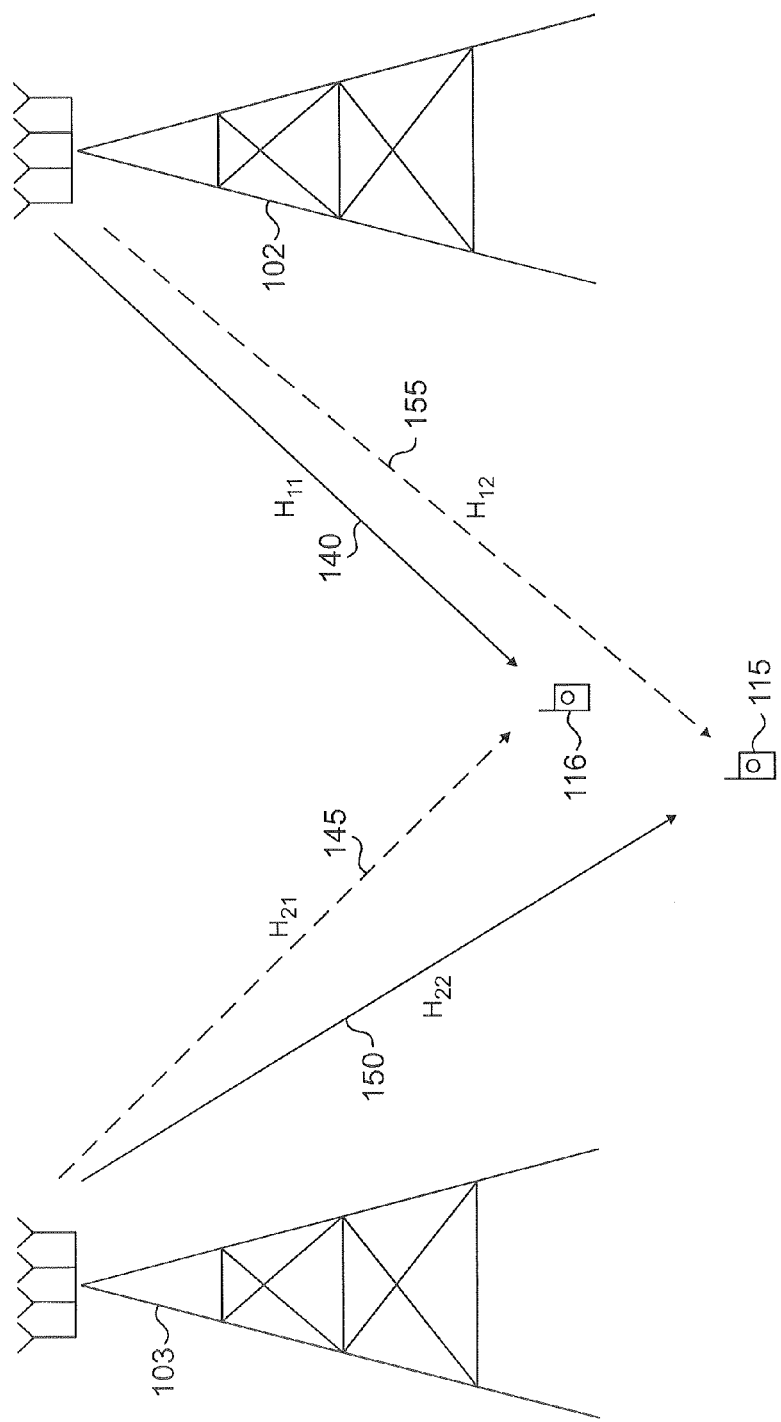
FIG. 1B illustrates exemplary wireless network 100 according to embodiments of the present disclosure.

Conventionally subscriber stations only reports to serving base stations about the preferred codebook vector or matrix based on the channels from the serving base station to the served subscriber station. For example, SS 116 chooses the transmitted codebook vector at BS 102 based on $H_{11}$ and SS 115 chooses the transmitted codebook vector at BS 103 based on $H_{22}$. By doing this, a strong interference may be created to the received signal at the other subscriber stations from different cells using the same bandwidth. Especially for the case where the subscriber stations are cell-edge users, the received power level of the interference signal and that of the intended signal are usually comparable which leads a very low signal-to-interference-and-noise ratio (SINR) at the subscriber station. In this particular example, the transmitted signal from BS 102 to SS 116 ($X_1$) 140 may cause strong interference for the received signal at SS 115 ($X_2$) 150 and vice-versa. When either of the subscriber stations in FIGS. 1A and 1B is at a cell-edge, the throughput of the cell-edge subscriber station suffers greatly from the interference because the received power levels of the intended signal and interference are comparable. This is one of the reasons why the average cell-edge throughput is significantly lower than the average cell throughput.

Using Precoding Matrix Indicator (PMI) Restriction, each subscriber stations indirectly feeds back the codebook vector that will cause the highest interference to the subscriber stations own signal. The codebook vector is fed-back to the interfering base station. Then the interfering base station excludes the reported codebook vector from the codebook and performs codebook vector selection on a restricted. In this way, the cell-edge throughput can be improved. However, using this approach, the user equipment will only report the codebook vector which causes the strongest interference and even with restrict codebook, the interference caused by the interfering base station (interfering eNB) may still be very high if not the highest.

In some embodiments, the cell-edge throughput is improved by coordinating between BS 102, BS 103 and SS 116 in a unified way. When SS 116 is a cell-edge user, SS 116 may experience a low throughput. The low throughput of SS 116 results mainly the interference from BS 103. However, interference avoidance operations, conducted by BS 103, result in the significant reduction or elimination of the interference. This can be shown as follows for the case where $N_T=4$ and $N_R=2$. The singular value decomposition (SVD) of the interfering channel matrix $H_{21}$ is defined by Equation 2:

$$H_{21} = U \Lambda V \quad \text{[Eqn. 2]}$$

In Equation 2, U is a 2×2 unitary matrix, $\Lambda$ is a 2×4 matrix, and V is a 4×4 unitary matrix. Further, $\Lambda$ has a structure as defined by Equation 3:

$$\Lambda = \begin{bmatrix} \lambda_1 & 0 & 0 & 0 \\ 0 & \lambda_2 & 0 & 0 \end{bmatrix}. \quad \text{[Eqn. 3]}$$

Therefore, as long as the first two elements of $VX_2$ are zero, there will be no interference for signal $X_1$ 140 at SS 116. In other words, as long as $N_T > N_R$ there are some codebook vectors that can be used by BS 103 that will cause little or even no interference for the signal from BS 102. As such, if SS 116 estimates the channel matrix $H_{21}$, SS 116 can send (inform) BS 103 through BS 102 a recommended direction to transmit in terms of little or no interference to the signal between BS 102 and SS 116.

Figure 5A:
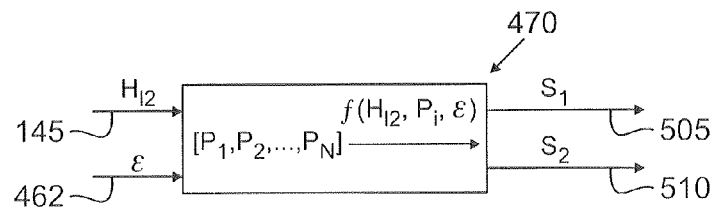
FIGS. 5A and 5B illustrate a codebook partitioner 470 according to embodiments of the present disclosure.
Figure 5B:
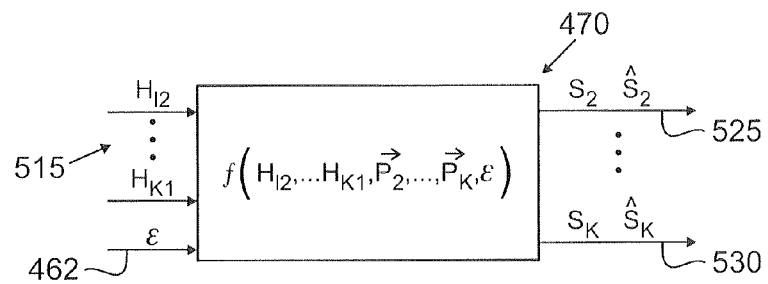

FIGS. 5A and 5B illustrate a codebook partitioner 470 according to embodiments of the present disclosure. The embodiments of the codebook partitioner 470 shown in FIGS. 5A and 5B are for illustration only. Other embodiments of the codebook partitioner 470 can be used without departing from the scope of this disclosure.

In some embodiments, illustrated in FIG. 5A, where there is one strong interference in the received signal, SS 116 can divide the standardized codebook into two subsets. The codebook partitioner 470 divides the codebook by creating a first set 505 (set one) and a second set 510 (set two) based on the configurable parameter threshold $\epsilon$ 462. Set one 505, also referred to as the preferable set, contains the codebook vectors or matrices that will cause interference to the receive signals less than threshold $\epsilon$ 462. Set two 510, also referred to as the restricted set, contains the complement of the first set 505.

The main processor 440 estimates the channel matrices for BS 103 (e.g., an interfering base station). The codebook partitioner 470 receives the interfering channel gain $H_{21}$. The codebook partitioner 470 applies Equation 4 to identify codebook information for the preferred set and for the restricted set.

$$f(H_{21}, P_i, \epsilon) = V H_{21} P_i \leq \epsilon. \quad \text{[Eqn. 4]}$$

$f(H_{21}, P_i, \epsilon)$ is a checking function. The checking function checks whether the preceding vector $P_i$ satisfies a specified criteria. If a $P_i$ satisfies the specified criteria, $P_i$ is placed in the preferred set $S_1$ 505. If $P_i$ does not satisfy the specified criteria, $P_i$ is placed in the restricted set $S_2$ 510. Equation 4 illustrates the checking function according to one exemplary criterion. In Equation 4, V is a filter at SS 116.

SS 116 then sends feedback information to BS 103. The feedback information (also referred herein as preceding matrix information) is related to the indices of the codebook vectors or matrices of either set, or both, depending on predetermined criteria. For example, one criterion might be the cardinality of the set. That is, SS 116 may use one bit to indicate which set of the indices are chosen, either from the preferable set or the restricted set.

In some embodiments illustrated in FIG. 5B, where there are several strong interferences in the received signal, SS 116 can feedback a combination of the preceding vectors and matrices for each interfering base station such that a total interference level is less than (<) a tolerable threshold $\epsilon$ 462. In such embodiments, the checking function is $f(H_{21}, \ldots H_{K1}, \vec{P}_2, \ldots, \vec{P}_K, \epsilon)$. In the checking function, K is the number of base stations seen by SS 116 such that K-1 is the number of interfering base stations. Further, $H_{21}, \ldots H_{K1}$ 515 are the channel matrices from the K-1 interfering base stations to SS 116, $\vec{P}_2, \ldots, \vec{P}_K$ are the K-1 codebooks for the K-1 interfering base stations, while $S_i$ 525 and $\hat{S}_i$ 530 are the preferred set and restricted set for an interfering base station "i".

In one example, SS 116 divides the interference level threshold $\epsilon$ 462 into several components. Each of the components corresponds to one interference level for one particular interfering base station. In such example, the information related to the codebook vectors and matrices is obtained for each interfering base stations using methods as described above with respect to FIG. 5A.

At least some of the components in FIGS. 3, 4, 5A and 5B may be implemented in software while other components may be implemented by configurable hardware or a mixture of software and configurable hardware.

Figure 6:
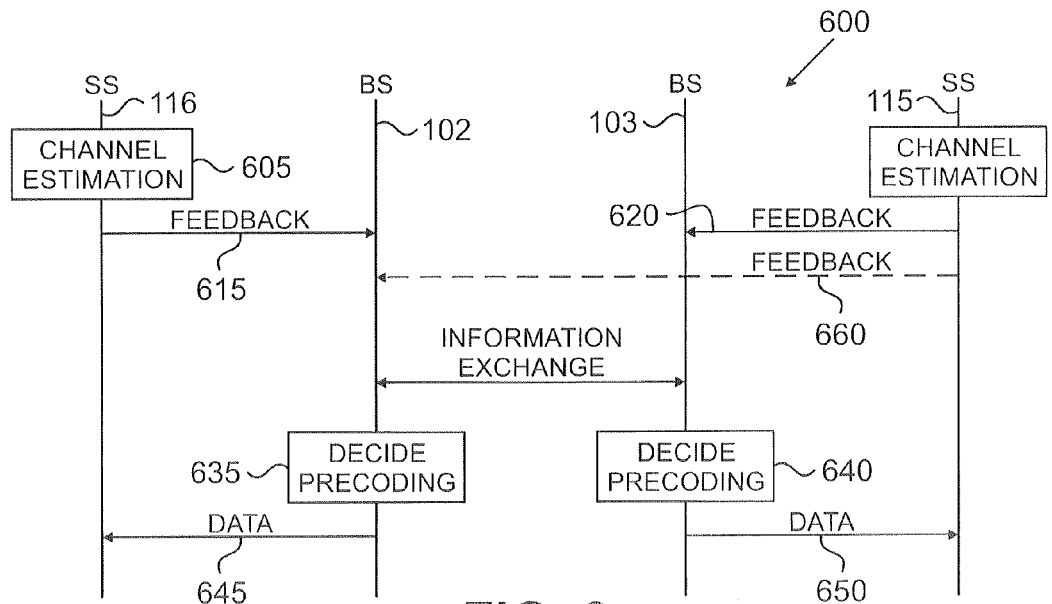
FIG. 6 illustrates a time diagram for interference avoidance according to embodiments of the present disclosure.

FIG. 6 illustrates a time diagram for interference avoidance according to embodiments of the present disclosure. The embodiment of the time diagram 600 shown in FIG. 6 is for illustration only. Other embodiments of the time diagram 600 can be used without departing from the scope of this disclosure.

In an example wherein SS 116 and SS 115 are edge-cell subscriber stations located in proximity to each, the communications between SS 115 and BS 103 can cause interference in the signals between SS 116 and BS 102. Further, the communications between SS 116 and BS 102 can cause interference in the signals between SS 115 and BS 106.

SS 116 performs channel estimation in step 605. SS 116 performs measurements based on reference signals received from BS 102 and from BS 103. SS 116 divides the codebook and identifies the preferred set 505 and restricted set 510. Thereafter, SS 116 sends feedback information (e.g., a preceding matrix information message) to BS 102 in step 615. The feedback information includes the codebook information such as the preferred set 505, restricted set 510 or both.

Additionally, SS 115 performs channel estimation in step 610. SS 115 performs measurements based on reference signals received from BS 103 and from BS 102. SS 115 divides the codebook and identifies the preferred set 505 and restricted set 510. Thereafter, SS 115 sends feedback information to BS 103 in step 620. The feedback information includes the codebook information such as the preferred set 505, restricted set 510 or both.

BS 102 and BS 103 exchange information in step 625. BS 102 sends the feedback information received from SS 116 to BS 103. Additionally, BS 103 sends feedback information received from SS 115 to BS 102. The exchange of information in step 625 may occur simultaneously or at different times such that BS 102 sends sends the feedback information received from SS 116 to BS 103 either before or after BS 103 sends the feedback information received from SS 115 to BS 102.

In step 635, BS 102 decides the preceding to be utilized in future transmissions. BS 102 determines if a codebook vector or matrix identified within the preferred set from SS 115 can be utilized without significant impairment to the communications to SS 116. For example, BS 102 can determine if an average SNR will pass beyond a base station threshold $\zeta$. Thereafter, BS 102 selects a codebook and transmits data to SS 116 in step 645.

In step 640, BS 103 decides the preceding to be utilized in future transmissions. BS 103 determines if a codebook vector or matrix identified within the preferred set from SS 116 can be utilized without significant impairment to the communications to SS 115. For example, BS 103 can determine if an average SNR will pass beyond a base station threshold $\zeta$. Thereafter, BS 103 selects a codebook and transmits data to SS 115 in step 650.

In some embodiments, SS 115 sends the feedback information directly to BS 102 in step 660. In such embodiments, BS 103 does not need to exchange information with BS 102 in step 625. BS 102 can use the feedback information received from SS 115 to decided preceding in step 635. However, in such embodiments, BS 102 can still send the feedback information received from SS 116 to BS 103.

It will be understood that illustration of the sequence of the operations by SS 116 and SS 115 can occur in any order or simultaneously. For example, the channel estimation performed by SS 115 may occur before, after or concurrently with the channel estimation performed by SS 116. Further, the illustration of the sequence of the operations by BS 102 and BS 103 can occur in any order or simultaneously. For example, the decide preceding 640 performed by BS 103 may occur before, after or concurrently with the decide precoding 635 performed by BS 102.

Figure 7:
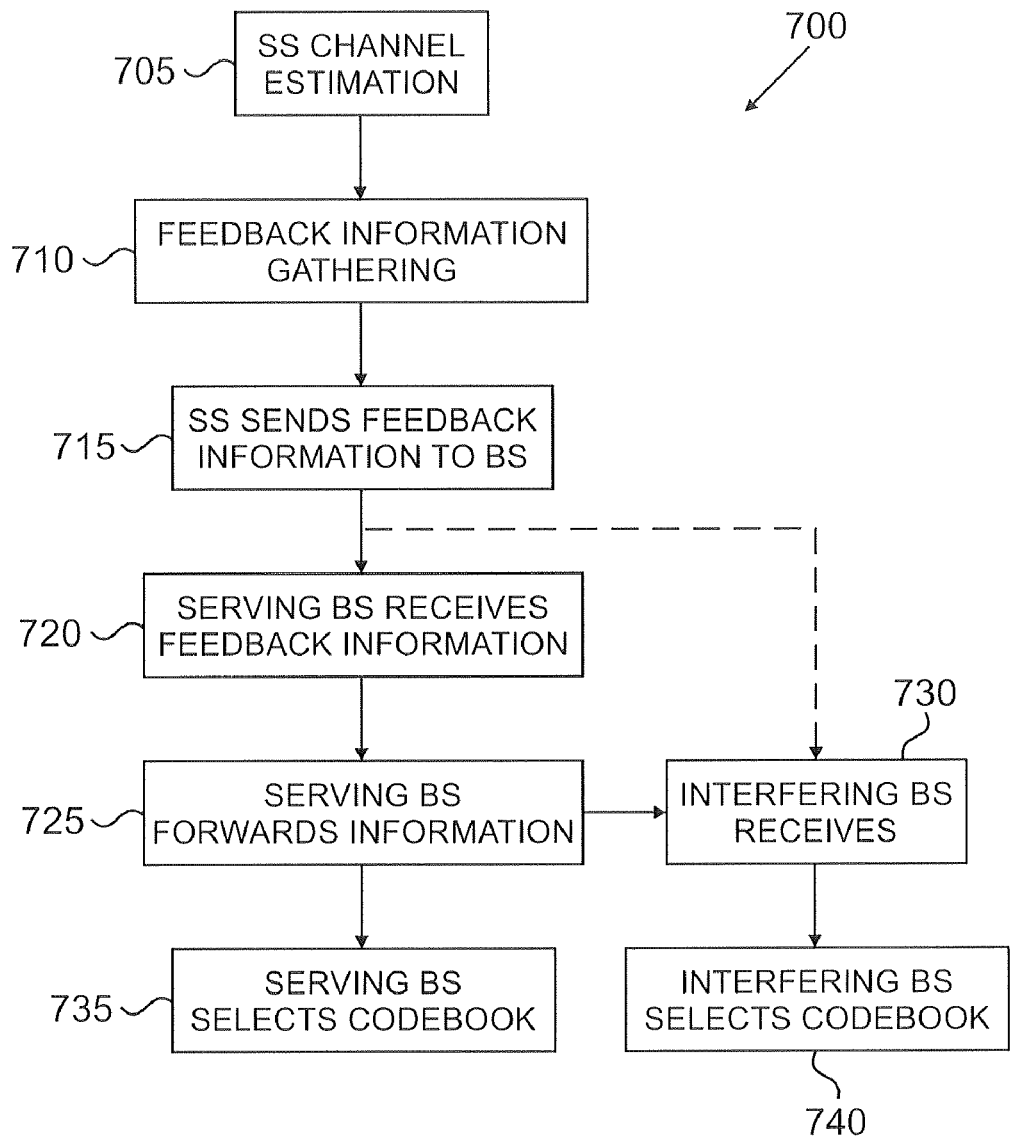
FIG. 7 illustrates a process for interference avoidance according to embodiments of the present disclosure.

FIG. 7 illustrates a process for interference avoidance according to embodiments of the present disclosure. The embodiment of the interference avoidance process 700 shown in FIG. 7 is for illustration only. Other embodiments of the interference avoidance process 700 can be used without departing from the scope of this disclosure.

In some embodiments, interfering base stations can avoid interference with each other by choosing different codebook vectors within a standardized codebook. This is achieved by allowing the base stations to choose codebook vectors or matrices to transmit their own signals in the space which creates little or even no interference to the other cells' subscriber stations in the same bandwidth.

In step 705, SS 116 performs channel estimation. SS 116 maybe, for example, a cell-edge subscriber station. SS 116 estimates the channel matrix from BS 102 (e.g., the serving base station). Further, SS 116 estimates the channel matrices from BS 103 (e.g., a strong interfering base station). SS 116 estimates the channel matrices from BS 102 and BS 103, respectively, through reference signals.

SS 116 generates feedback information in step 710. SS 116 identifies preferred codebook vectors or matrices. Based on the estimated channel matrices, SS 116 searches for a codebook vector or matrix that maximizes a receive signal power for SS 116. Thus, SS 116 generates a preceding vector or matrix for its own serving cell (e.g. from BS 102) to maximize the received power for SS 116. Additionally, SS 116 can search for a codebook vector or matrix that maximizes some other performance measures. SS 116 searches the codebook vector or matrix from BS 102 together with the codebook vectors or matrices from BS 103 subject to the configurable parameter threshold $\epsilon$ 462. Thus, SS 116 identifies or calculates a number of preceding vectors or matrices such that, when used by BS 103, an interference in the signal between SS 116 and BS 102 will be below threshold $\epsilon$ 462. In some embodiments, SS 116 identifies only the codebook vectors or matrices from BS 103 that will cause an interference in the received signal from BS 102. For example, the codebook information to each interfering base station can be either the combination of the precoding vectors or matrices that will create interference less than or equal to the threshold $\epsilon$ 462 or the combination of the preceding vectors or matrices that will create interference greater than the threshold $\epsilon$ 462. In some additional and alternative embodiments, SS 116 divides the standardized codebook into a preferred set 505 and a restricted set 510.

In step 715, SS 116 sends the feedback information (also referred to as preceding matrix message) to BS 102. The feedback information includes codebook information related to the codebook vectors or matrices. The feedback information is reported by SS 16 to BS 102. Additionally, information related to the average SNR (or some other performance measures) together with the SNR improvement (or some other performance measures) when BS 103 is using the preferred codebook vectors or matrices are also reported.

For example, for all the channels connected to SS 116, SS 116 sends feedback information including codebook information related to either the directions of strong eigen-channels or those of the weak eigen-channels. SS 116 sends this codebook information either to BS 102 or to BS 103 directly.

For the system shown in FIGS. 1A and 1B, the interfering channel matrix received at SS 116 is $H_{21}$ 140. SS 116 can send the direction of the eigen-channels of $H_{21}$ 140 where the corresponding singular value is substantial. Furthermore, SS 116 may also elect to feedback the receive channel vector from each antenna to BS 103 directly or indirectly through BS 102. For example, for the interfering channel matrix $H_{21}$ 140, SS 116 can feedback quantized directions of $h_1, \ldots h_{N_R}$, where is defined by Equation 5:

$$H_{21} = [h_1, \ldots h_{N_R}]^T. \quad \text{[Eqn. 5]}$$

SS 116 may also send, directly to BS 103, the feedback information related to the interfering channel gains with or without the scheduling information. For example, SS 116 can send the scheduling information to the BS 103. Upon receiving the scheduling information, BS 103 may get the information about interference level and information related to the channel matrices from previous coordination between BS 103 and SS 116 for the particular frequency band.

BS 102 receives the feedback information instep 720. BS 102 processes the information and identifies that the interfering base station is BS 103. Then BS 102 forwards the feedback information to BS 103 in step 725.

BS 103 receives the feedback information from BS 102 in step 730. In some embodiments, BS 103 receives the feedback information directly from SS 116 in step 730.

In steps 735 and 740, BS 102 and BS 103 respectively select codebook vectors or matrices for future transmissions. In step 740, upon receiving feedback information from either BS 102 or SS 116, BS 103 chooses a codebook vector or matrix to send to SS 115 (.e.g., the intended subscriber station for BS 103). BS 103 can select the codebook vector or matrix to send to SS 115 based on the feedback information from SS 116. BS 102 also chooses a codebook vector or matrix to send to SS 116 in step 735.

For example, BS 103 may choose to restrict the codebook vectors or matrices, or BS 103 can choose the codebook vectors or matrices from the preferred set based on the average SNR values of SS 115. To be specific, BS 103 may decide the preceding vectors or matrices to SS 115 depending on the performance improvement for SS 116 and whether an average SNR for the communications between BS 103 and SS 115 passes beyond a certain base station threshold $\zeta$. As another example, if BS 103 identifies that one or more of the codebook vectors or matrices in the preferred set 505 can be used without affecting the SINR of the signal between BS 103 and SS 115, BS 103 may select one of the codebook vectors or matrices in the preferred set. Additionally, BS 103 may avoid selection of a codebook vector or matrix in the restricted set if the restricted set is the feedback information that is provided.

In some embodiments, SS 116 sends a special indicator to enable a dynamic inter-cell interference coordination. This dynamic overload indicator is obtained in the "Feedback Information Generating" step 710 where either all (or most of) the combinations of the codebook vectors or matrices will bring an interference level greater than the threshold $\epsilon$ 462 or all the combinations will produce an interference level smaller than the threshold $\epsilon$ 462. After obtaining this indicator, BS 102 and BS 103 can jointly perform inter-cell interference coordination to avoid inter-cell interference.

For example, BS 102 schedules SS 116 to another frequency band (or other resource blocks) if BS 102 receives the dynamic overload indicator from SS 116 indicating that all (or most of) the combinations of the codebook vectors or matrices cannot bring the interference level to be smaller than threshold $\epsilon$ 462.

In some such embodiments, where the SNR between BS 102 and SS 116 reaches a predetermined level, SS 116 is configured to raise the threshold $\epsilon$ 462 such that all the combinations will produce an interference level smaller than the threshold $\epsilon$ 462. In some additional and alternative embodiments, where the SNR is above a certain threshold $\zeta$, BS 102 is configured to adjust the threshold $\epsilon$ 462. In such embodiments, BS 102 can send a separate signal to SS 116 or BS 102 can include the adjustment command within existing signaling between BS 102 and SS 116.

In an additional example, BS 102 may request that BS 103 not schedule subscriber stations (e.g., SS 115) in the particular frequency bands (resource blocks) upon receiving the dynamic overload indicator from SS 116.

In some such embodiments, SS 116 informs BS 102 that all (or most of) the combinations of the codebook vectors or matrices cannot bring the interference level to be smaller than threshold $\epsilon$ 462. Thereafter, BS 102 utilizes other means, such as, but not limited to, using a different frequency band, to transmit to SS 116.

Figure 8:
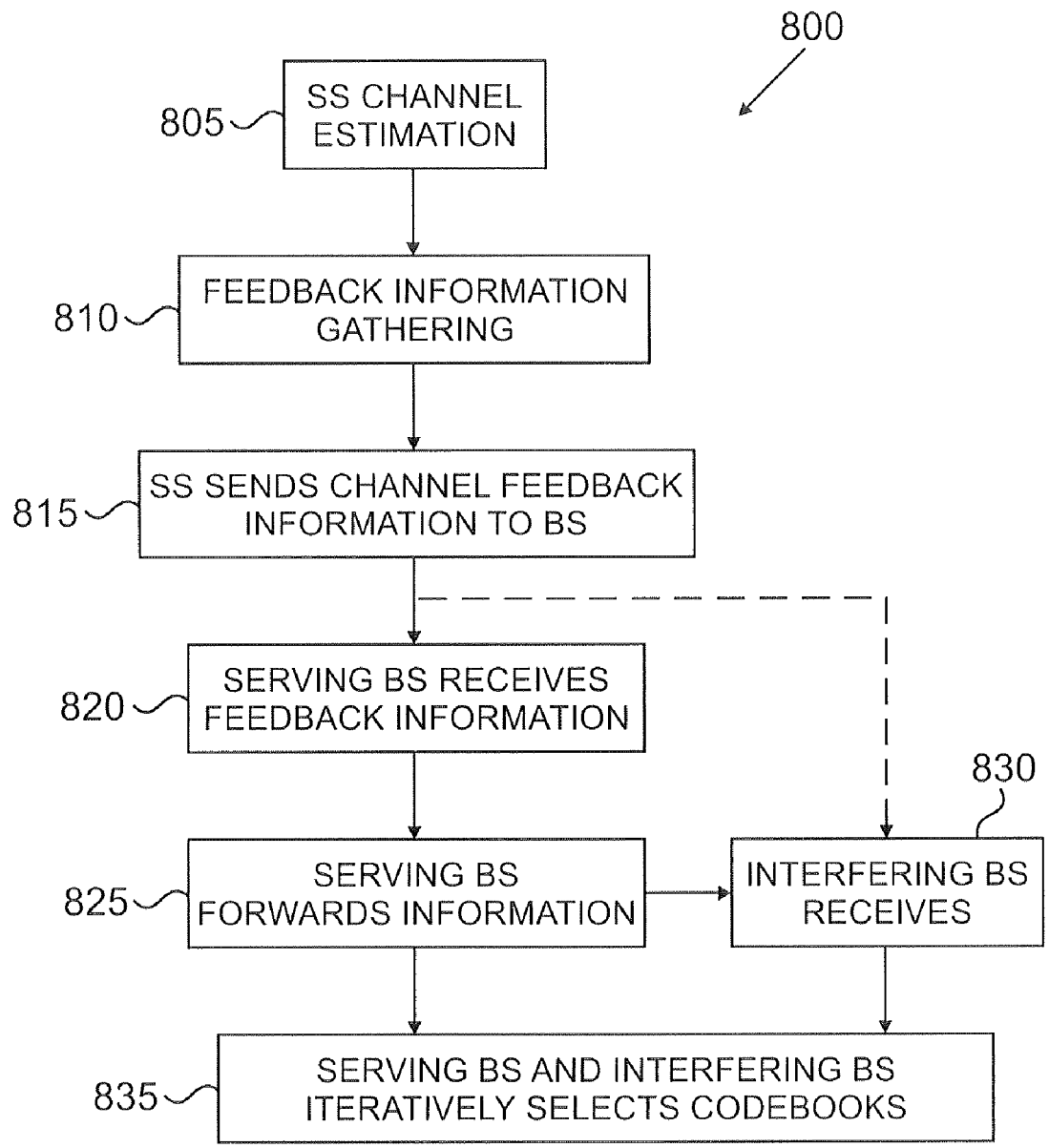
FIG. 8 illustrates another process for interference avoidance according to embodiments of the present disclosure.

FIG. 8 illustrates another process for interference avoidance according to embodiments of the present disclosure. The embodiment of the interference avoidance process 800 shown in FIG. 8 is for illustration only. Other embodiments of the interference avoidance process 800 can be used without departing from the scope of this disclosure.

In some embodiments, interfering base stations can avoid interference with each other by choosing different codebook vectors within a standardized codebook. In such embodiments, BS 102 and BS 103 share information related to all the channel matrices. BS 102 and BS 103 iteratively find good preceding vectors and matrices that avoid interference in the others respective signals.

In step 805, SS 116 performs channel estimation. SS 116 maybe, for example, a cell-edge subscriber station. SS 116 estimates the channel matrix from BS 102 (e.g., the serving base station). Further, SS 116 estimates the channel matrices from BS 103 (e.g., a strong interfering base station). SS 116 estimates the channel matrices from BS 102 and BS 103, respectively, through reference signals.

SS 116 generates channel feedback information in step 810 based on the estimated channel matrices. SS 116 sends, to BS 102, channel feedback information related to the channel matrices to BS 102 and the channel matrices to BS 103 in step 815. In some embodiments, SS 116 sends the channel feedback information directly to BS 103 in step 815.

For example, for all the interfering channels connected to SS 116, SS 116 sends channel feedback information related to either the directions of strong eigen-channels or those of the weak eigen-channels of $H^H H$ (where H is the interfering channel matrix) The channel feedback information is sent either to BS 102 or to BS 103 directly. For the system shown in FIGS. 1A and 1B, the interfering channel matrix received at SS 116 is $H_{21}$. SS 116 can send the direction of the eigen-channels of $H_{21}^H H_{21}$ where the corresponding singular value is substantial.

In some additional embodiments, SS 116 sends quantized information about $H^H H/\|H\|_F^2$ where $\|H\|_F^2$ is the Frobenius norm of matrix H. For example, a different codebook of $H^HH/\|H\|_F^2$ can be designed for sending the channel feedback information related to the interfering channel matrix.

BS 102 receives and process the channel feedback information received from SS 116 in step 820. BS 102 processes the channel feedback information and identifies that the interfering base station is BS 103. Then BS 102 forwards the channel feedback information related to all the channel matrices obtained from SS 116 to BS 103 in step 825.

BS 103 receives the channel feedback information from BS 102 in step 830. In some embodiments, BS 103 receives the channel feedback information directly from SS 116 in step 830.

In steps 835, BS 102 and BS 103 respectively iteratively select codebook vectors or matrices for future transmissions. BS 103 and BS 102 iteratively select codebook vectors or matrices for future transmissions independent of each other. Upon receiving information from either BS 102 or SS 116, BS 103 chooses a codebook vector or matrix to send to SS 115 (e.g., the intended subscriber station for BS 103). BS 102 also chooses a codebook vector or matrix to send to SS 116.

Figure 9:
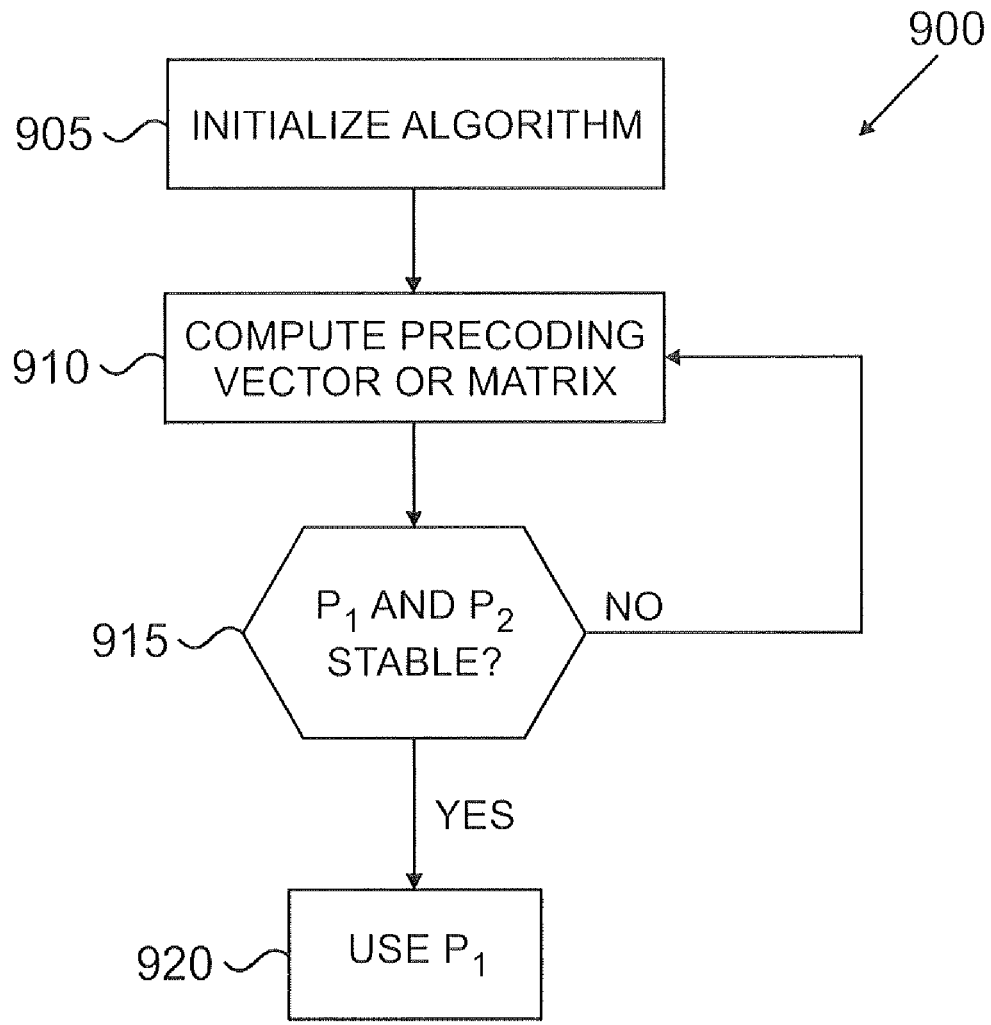
FIG. 9 illustrates a process for codebook selection according to embodiments of the present disclosure.

FIG. 9 illustrates a process for codebook selection according to embodiments of the present disclosure. The embodiment of the codebook selection process 900 shown in FIG. 9 is for illustration only. Other embodiments of the codebook selection process 900 can be used without departing from the scope of this disclosure.

The codebook selection process step 835 for BS 102 is detailed in FIG. 9. BS 102 and BS 103 each apply an iterative method to find the codebook vector or matrix. Without loss of generality, the procedures performed at BS 102 are illustrated. However, it will be understood that the procedures outlined for BS 102 apply equally to BS 103. In such embodiments, the preceding vector or matrix of BS 102 depends on the preceding vector or matrix of BS 103 (since it will determine the interference caused to SS 116).

In step 905, an algorithm is initialized. BS 102 computes a possible preceding vector or matrix for BS 103 (let $P_2$ be the precoding vector or matrix). Also, BS 102 searches the preceding vector or matrix to maximize (or minimize) some performance measures based on the assumption that BS 103 is using $P_2$ (let $P_1$ be the resulting preceding vector or matrix). For example, BS 102 can search the preceding vector or matrix which maximizes the SNR or throughput.

In step 910, BS 102 computes a preceding vector and matrix for BS 103 to maximize or minimize some performance measures based on the fact that BS 102 is using $P_1$ (update the resulting vector or matrix to $P_2$). BS 102 further updates its preceding vector or matrix under some performance measures based on the assumption that BS 103 is using $P_2$ (update the resulting vector or matrix to $P_1$).

In step 915, BS 102 determines if $P_1$ and $P_2$ are stable such that a steady state has been achieved. If $P_1$ and $P_2$ are not stable, then BS 102 returns to step 910. If $P_1$ and $P_2$ are stable (no change or minimal change), then BS 102 uses $P_1$ as the precoding vector or matrix. A similar procedure will take place in BS 103 to find $P_2$.

Figure 10:
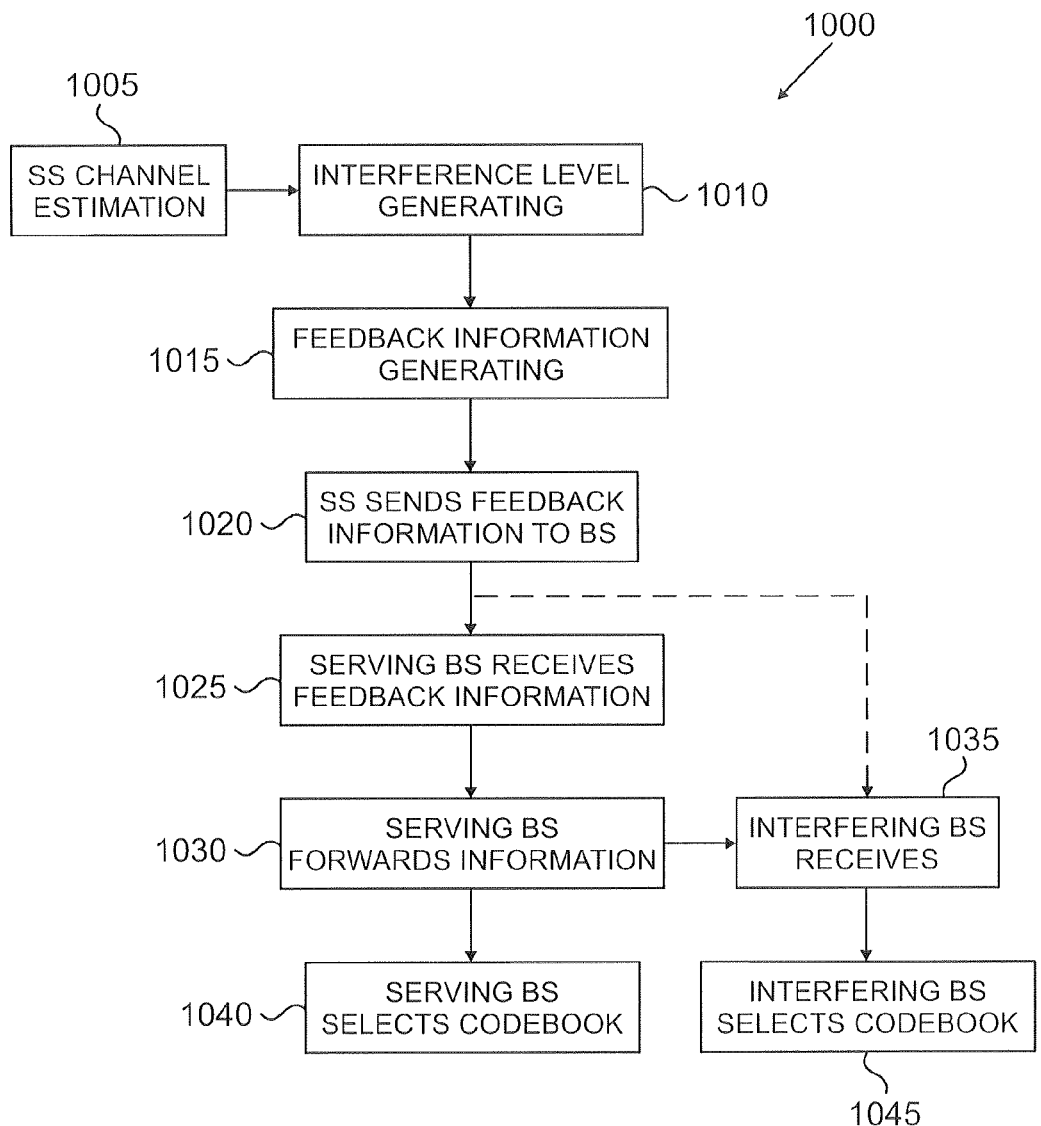
FIG. 10 illustrates another process for interference avoidance according to embodiments of the present disclosure.

FIG. 10 illustrates a process for interference avoidance according to embodiments of the present disclosure. The embodiment of the interference avoidance process 1000 shown in FIG. 10 is for illustration only. Other embodiments of the interference avoidance process 1000 can be used without departing from the scope of this disclosure.

In some embodiments, SS 116 sends an interference avoidance message to BS 102. In such embodiments, the interference avoidance message (IAM) is a value that represents the codebook information, e.g., represents either the preferred set or restricted set of the codebook, or both. For example, the IAM may be a single PMI vector and a variable. In response, BS 103 calculates the preferred set based on the single PMI vector and variable.

In step 1005, SS 116 performs channel estimation. SS 116 maybe, for example, a cell-edge subscriber station. SS 116 estimates the channel matrix from BS 102 (e.g., the serving base station). Further, SS 116 estimates the channel matrices from BS 103 (e.g., a strong interfering base station). SS 116 estimates the channel matrices from BS 102 and BS 103, respectively, through reference signals.

Then, BS 102 sends a configuration message to SS 116 in step 1010. The configuration message includes the threshold $\epsilon$ 462. In some embodiments, the configuration message contains commands for SS 116 to adjust the threshold $\epsilon$ 462. Threshold $\epsilon$ 462 indicates the interference level at SS 116. In some embodiments, the threshold $\epsilon$ 462 may represent a target interference level (e.g., tolerable interference level) for SS 116. Receiving the threshold $\epsilon$ 462 by SS 116 triggers precoding vector or matrix reporting for inter-cell interference avoidance (or mitigation).

In step 1015, SS 116 performs feedback information generation. SS 116 identifies preferred codebook vectors or matrices. Based on the estimated channel matrices, SS 116 searches for a codebook vector or matrix that maximizes a receive signal power for SS 116. Additionally, SS 116 can search for a codebook vector or matrix that maximizes some other performance measures. SS 116 searches the codebook vector or matrix from BS 102 together with the codebook vectors or matrices from BS 103 subject to the configurable parameter threshold $\epsilon$ 462. In some embodiments, SS 116 identifies only the codebook vectors or matrices from BS 103 that will cause an interference in the received signal from BS 102. For example, the codebook information to each interfering base station can be either the combination of the preceding vectors or matrices that will create interference less than or equal to the threshold $\epsilon$ 462 or the combination of the preceding vectors or matrices that will create interference greater than the threshold $\epsilon$ 462. In some additional and alternative embodiments, SS 116 divides the standardized codebook into a preferred set 505 and a restricted set 510. From the interference level parameter (i.e., threshold $\epsilon$ 462) obtained from BS 102, SS 116 also computes the IAM. The IAM indicates the set of recommended or restricted preceding vectors or matrices for the interfering base stations (e.g., BS 103).

In some embodiments, BS 102 and SS 116 negotiate to feedback the combination of the preceding vectors or matrices that will create interference less than or equal to threshold $\epsilon$ 462. Additionally, if SS 116 cannot find any combination of the preceding vectors or matrices that will create interference less than or equal to threshold $\epsilon$ 462, SS 116 can feedback codebook vector or matrix only for BS 102.

In additional and alternative embodiments, BS 102 and SS 116 negotiate to feedback the combination of the preceding vectors or matrices that will create interference greater than threshold $\epsilon$ 462. Additionally, if SS 116 cannot find any combination of the preceding vectors or matrices that will create interference greater than threshold $\epsilon$ 462, SS 116 can feedback codebook vector or matrix only for BS 102.

SS 116 sends feedback information to BS 102 in step 1020. The feedback information that SS 116 sends includes several elements. In some embodiments, the feedback information includes one or more of:

1. Codebook information, e.g., information related to the codebook vector or matrix which maximizes the receive signal power (or some other performance measures) for BS 102

(e.g., the serving base station) and the information related to the codebook vector or matrix which maximizes the receive signal power (or some other performance measures) for BS 103 (e.g., the interfering base station).

2. Information related to the average signal-to-interference-and-noise-ratio (SINR) improvement or some other performance measures. For example, this information can represent the achievable average SINR (or some other performance measures) when BS 102 is using the precoding vector or matrix feedback from SS 116.

3. The corresponding IAM for each of the interfering base stations (e.g., for BS 103). The IAM sent by SS 116 was computed by SS 116 in step 1015 using threshold $\epsilon$ 462.

In some embodiments, the information related to the average SINR improvement is a change in channel quality information ($\Delta$CQI) when BS 103 is using the recommended set of preceding vectors or matrices.

For example, $\Delta$CQI can be the difference between the expected SINR when BS 103 is using the recommended set and an expected SINR when BS 103 is not using the recommended set.

In another example, $\Delta$CQI can be the difference between the worst case SINR when BS 103 is using the recommended sets and the worst case SINR when BS 103 is not using the recommended sets.

In yet another example, $\Delta$CQI can be the difference between the worst case SINR when BS 103 is using the recommended sets and the expected SINR when BS 103 is not using the recommended sets In still another example, $\Delta$CQI can be the difference between the expected SINR when BS 103 is using the recommended sets and the worst case SINR when BS 103 is not using the recommended sets.

In some embodiments, SS 116 sends the feedback information directly to BS 103. In such embodiments, SS 116 sends one or more of the codebook information related to codebook vector or matrices for the interference channel, the IAM message indicating the set of recommended (e.g., preferred) or restricted preceding vectors or matrices, and the information related to SINR improvement if the set is applied at BS 103.

BS 102 receives the feedback information in step 1025. BS 102 processes the information and identifies that the interfering base station is BS 103. Then BS 102 forwards the feedback information to BS 103 in step 1030. The IAM indicating the recommended (preferred) or the restricted set of the precoding vectors or matrices are reported to BS 103. The corresponding IAMs for different base stations and the SINR (or other performance measures) improvements are forwarded to their respective base stations as well.

BS 103 receives the feedback information from BS 102 in step 1035. In some embodiments, BS 103 receives the feedback information directly from SS 116 in step 1035.

In steps 1040 and 1045, BS 102 and BS 103 respectively select codebook vectors or matrices for future transmissions. In step 1045, upon receiving information from either BS 102 or SS 116, BS 103 chooses a codebook vector or matrix to send to SS 115 (.e.g., the intended subscriber station for BS 103) based on the feedback information (e.g., one or more of the preceding codebook vector or matrix, the IAM, and the SINR improvement $\Delta$CQI).

BS 102 also chooses a codebook vector or matrix to send to SS 116 in step 1040. BS 102 may choose a codebook vector or matrix to send to SS 116 based on the feedback information (e.g., one or more of the preceding codebook vector or matrix, the IAM, and the SINR improvement $\Delta$CQI) received from another base station or subscriber station.

In some embodiments, when BS 103 receives a request from BS 102, BS 103 chooses to follow the recommendation based the SINR improvement report. Once BS 103 decides to follow the recommendation, BS 103 may choose a preceding codebook vector or matrix among the set specified by the IAM. In some such embodiments, BS 103 chooses the preceding codebook vector or matrix which maximizes the SINR (or other performance measures) from BS 103 to SS 115 within the set.

In some embodiments, when BS 103 receives multiple requests from different base stations, BS 103 may choose to follow a recommendation based on the SINR improvement reports from various base stations. A rank of the requests can be ordered based on $\Delta$CQI and the channel between BS 103 and SS 115.

In some embodiments, BS 102 sends an activation message indicating which subscriber stations are allowed to participate in the interference avoidance process. In such embodiments, BS 102 sends the activation message to SS 116 indicating that SS 116 is to report feedback information (e.g., reporting the preferred set or restricted set or sending the IAM). In some embodiments, BS 102 sends the activation message to subscriber stations, such as SS 114, indicating that those respective subscriber stations will not participate in interference avoidance. SS 114 may or may not be an edge-cell device.

In some embodiments, by default all subscriber stations participate in the interference avoidance process and report feedback information. In such embodiments, BS 102 sends a deactivation message to subscriber stations that are not to participate in the interference avoidance process.

In some embodiments, the IAM includes a distance measurement. In such embodiments, SS 116 generates the IAM based on a distance measure that partitions the preceding codebook vectors into two parts. Part one (preferable set $S_1$ 505) contains the codebook vectors or matrices that will cause interference to the receive signals less than threshold $\epsilon$ 462; while part two (restricted set $S_2$ 510) contains the complement of the first set. The IAM is actually a threshold to distinguish these two sets under different distance measures. The codebook partitioner 470 applies Equation 4 to identify codebook information for the preferred set and for the restricted set.

Again, $f(H_{21}, P_i, \epsilon)$ is a checking function. The checking function checks whether the preceding vector $P_i$ satisfies a specified criteria. If a $P_i$ satisfies the specified criteria, $P_i$ is placed in the preferred set $S_1$ 505. If $P_i$ does not satisfy the specified criteria, $P_i$ is placed in the restricted set $S_2$ 510. Equation 4 illustrates the checking function according to one exemplary criterion. In Equation 4, V is a filter at SS 116.

Once the two sets are formed, the codebook partitioner 470 computes the distance from the elements in one particular set to the preceding codebook vector or matrix that maximizes the interference power (or other performance measure) received at SS 116. An IAM threshold $\delta$ can then be used to distinguish these two sets.

For example, a chordal distance can be used to measure the distance between different preceding codebook matrices and set the threshold to be the maximum distance from the elements of preferred set to the precoding matrix which maximizes the interference power.

In some embodiments, BS 102 configures the target tolerable interference level threshold $\epsilon$ 462 and a target SINR improvement $\Delta$CQI. BS 102 sends the target tolerable interference level threshold $\epsilon$ 462 and a target SINR improvement $\Delta$CQI to SS 116 in the configuration message discussed hereinabove with respect to FIG. 10, step 1010. Then, SS 116 performs feedback information generation (discussed hereinabove with respect to FIG. 10, step 1015). In such embodiments, SS 116 reports the feedback information only if the SINR improvement ΔCQI is greater than the target SINR improvement ΔCQI. If SS 116 calculates that the SINR improvement ΔCQI is not greater than the target SINR improvement ΔCQI, then SS 116 does not send the feedback information to BS 102 or BS 103. In some such embodiments, if SS 116 calculates that the SINR improvement ΔCQI is not greater than the target SINR improvement ΔCQI, then SS 116 sends a message to BS 102 indicating that SS 116 cannot meet the target SINR improvement ΔCQI. Accordingly, based on the feedback information related to the average SINR for SS 116, BS 102 may decide to choose different strategies to serve SS 116. For example, when the average SINR (or some other performance measures) is large for SS 116, BS 102 may choose not to do anything. When the average SINR (or some other performance measures) is small for SS 116, BS 102 may choose to reschedule SS 116 on different resource blocks.

In some embodiments, SS 116 configures the target tolerable interference level threshold ε 462 and a target SINR improvement ΔCQI. In such embodiments, BS 102 sends the activation message, discussed hereinabove, to SS 116 in step 1010. Then, SS 116 performs feedback information generation (discussed hereinabove with respect to FIG. 10, step 1015). SS 116 configures the IAM threshold δ locally to be sent to BS 103. For example, IAM threshold δ is computed based on the locally configured tolerable interference level threshold ε 462 through different distance measures. In such embodiments, SS 116 includes a locally configurable target tolerable interference level threshold ε 462. After estimating the channels to BS 103 (e.g., the interfering base stations), SS 116 can partition the precoding codebook vectors and matrices into two sets 505, 510 and compute the IAM threshold δ based on different distance measures. The examples of the distance measures can be the cross-correlation between different precoding codebook vectors and the chordal distance between different precoding codebook matrices.

In some embodiments, serving base stations configure the target tolerable interference level threshold ε 462 and a target SINR improvement ΔCQI for participating subscriber stations. In such embodiments, BS 102 sends the configuration message and activation message as unified message to SS 116. Then, SS 116 performs feedback information generation (discussed hereinabove with respect to FIG. 10, step 1015). SS 116 configures the IAM threshold δ locally to be sent to BS 103. SS 116 reports the feedback information only if the SINR improvement ΔCQI is greater than the target SINR improvement ΔCQI. If SS 116 calculates that the SINR improvement ΔCQI is not greater than the target SINR improvement ΔCQI, then SS 116 does not send the feedback information to BS 102 or BS 103. In some such embodiments, if SS 116 calculates that the SINR improvement ΔCQI is not greater than the target SINR improvement ΔCQI, then SS 116 sends a message to BS 102 indicating that SS 116 cannot meet the target SINR improvement ΔCQI. Accordingly, based on the feedback information related to the average SINR for SS 116, BS 102 may decide to choose different strategies to serve SS 116.

For example, when the average SINR (or some other performance measures) is large for SS 116, BS 102 may choose not to do anything.

When the average SINR (or some other performance measures) is small for SS 116, BS 102 may choose to reschedule SS 116 on different resource blocks.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a subscriber station capable of performing channel estimation, said subscriber station comprising:
   a processor;
   a memory; and
   a codebook partitioner configured to divide a codebook into two sets, wherein a first set of said two sets corresponds to codebook information that will cause an interference in a received signal to be less than a threshold and said processor configured to send at least one of said two sets to a base station, wherein said threshold is configurable by one of said subscriber station and a serving base station.

2. The subscriber station as set forth in claim 1, wherein said codebook information comprises at least one of codebook vectors and codebook matrices.

3. The subscriber station as set forth in claim 1, wherein said base station is an interfering base station.

4. The subscriber station as set forth in claim 3, wherein said processor further is configured to transmit scheduling information to said interfering base station.

5. The subscriber station as set forth in claim 1, wherein said processor is configured to send a second set of said two sets, said second set corresponding to codebook information that will cause an interference in a received signal to be greater than a threshold.

6. The subscriber station as set forth in claim 1, wherein said processor is configured to send an indicator identifying one of a recommended precoding matrix information and a restricted precoding matrix information.

7. The subscriber station as set forth in claim 1, wherein the base station is configured to choose a precoding matrix in response to the at least one of the two sets.

8. The subscriber station as set forth in claim 1, wherein said processor is configured to send an overload indicator when all of said codebook information will cause an interference in a received signal to be greater than a threshold.

9. The subscriber station as set forth in claim 1, wherein said processor further is configured to transmit a statistical computation corresponding to a serving channel and one or more interfering channels.

10. The subscriber station as set forth in claim 9, wherein said statistical computation is related to at least one of a direction of a strong eigen-channel and a weak eigen-channel.

11. A wireless communications network comprising a plurality of base stations, each one of said base stations capable of selecting one of a plurality of codebooks for precoding, each of said base stations comprising:
   a receiver configured to receive feedback information from at least one subscriber station, the feedback information comprising at least one of a recommended set of codebook information and a restricted set of codebook information; and
   a controller configured to identify the at least one of the recommended set of codebook information and the restricted set of codebook information, wherein each of the base stations is configured to compute a precoding matrix independently and iteratively.

12. The network of claim 11, wherein said controller is configured to choose the precoding matrix in response to said recommended set of codebook information.

13. The network of claim 12, wherein said controller is configured to choose the precoding matrix that maximizes its own channel performance measure.

14. The network of claim 13, wherein the controller is configured to choose the precoding matrix by one of:
   a cross-correlation method; and
   selecting from a precoding matrix closest to its own subscriber station precoding matrix.

15. The network of claim 11, wherein said controller is configured to choose a compliment precoding matrix in response to said restricted set of codebook information.

16. The network of claim 11, wherein said controller is configured to ignore said feedback information.

17. The network of claim 11, wherein said feedback information further comprises an overload indicator when all of a codebook information will cause an interference in a signal received by a subscriber station to be greater than a threshold.

18. The network of claim 17, wherein said controller is configured to schedule said subscriber station to another frequency band when the feedback information comprises the overload indicator.

19. The network of claim 17, wherein said base station is configured to send a request to an interfering base station to schedule a subscriber station served by said interfering base station to another frequency band when the feedback information comprises the overload indicator.

20. The network of claim 17, wherein the threshold is configurable by one of the subscriber station.

21. The network of claim 11, wherein each of said base stations is configured to continue iterative computations, verifying after each iteration, until a steady state of the computed precoding matrix is obtained.

22. For use in a wireless communication network, a method of interference avoidance, the method comprising:
   receiving configuration information for a threshold:
   estimating channel information;
   identifying codebook information that will cause an interference in a received signal to be less than the threshold;
   dividing a codebook into subsets, wherein at least one subset corresponds to the identified codebook information; and
   transmitting feedback information associated with the at least one subset.

23. The method as set forth in claim 22, further comprising computing a value for the codebook information, the value indicating at least one of a set of preferred precoding vectors, a set of restricted precoding vectors, a set of preferred precoding matrices, and a set of restricted precoding matrices for an interfering base station.

24. The method as set forth in claim 22, wherein transmitting comprises transmitting the feedback information to a serving base station.

25. The method as set forth in claim 22, wherein transmitting comprises transmitting the feedback information to an interfering base station.

26. The method as set forth in claim 22, wherein the feedback information comprises a dynamic indicator indicating that all of said codebook information will cause an interference in a received signal to be greater than the threshold.

27. For use in a wireless communication network, a method of interference avoidance, the method comprising:
   receiving feedback information, the feedback information including a set of codebook information that identifies one of a recommended set and a restricted set;
   determining a response to said feedback information;
   selecting a precoding matrix based on the determined response; and
   forwarding the feedback information to an interfering base station.

28. The method as set forth in claim 27, wherein the feedback information further comprises a value for the codebook information, the value indicating at least one of a set of preferred precoding vectors, a set of restricted precoding vectors, a set of preferred precoding matrices, and a set of restricted precoding matrices for an interfering base station.

29. The method as set forth in claim 27, further comprising transmitting configuration information for a threshold used to determine said feedback information.

30. The method as set forth in claim 27, further comprising selecting a compliment precoding matrix based on the feedback information.

31. The method as set forth in claim 27, wherein the feedback information comprises a dynamic indicator indicating that all of said codebook information will cause an interference in a received signal to be greater than a threshold.

32. The method as set forth in claim 27, further comprising iteratively computing the precoding matrix independently.

33. The method as set forth in claim 32, wherein computing further comprises:
   continuing iterative computations; and
   verifying after each iteration until a steady state of the computed precoding matrix is obtained.

* * * * *